United States Patent
Maunder et al.

(10) Patent No.: US 8,818,113 B2
(45) Date of Patent: Aug. 26, 2014

(54) IMAGE CLUSTERING METHOD

(75) Inventors: David John Maunder, Macquarie Park (AU); Rob Sangster, Mosman (AU); Barry James Drake, Thornleigh (AU)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/477,955

(22) Filed: May 22, 2012

(65) Prior Publication Data

US 2012/0301039 A1    Nov. 29, 2012

(30) Foreign Application Priority Data

May 24, 2011    (AU) ................. 2011202609

(51) Int. Cl.
  *G06K 9/62*    (2006.01)
  *G06K 9/54*    (2006.01)
  *G06K 9/60*    (2006.01)

(52) U.S. Cl.
  USPC ........................... 382/225; 382/305

(58) Field of Classification Search
  None
  See application file for complete search history.

(56) References Cited

U.S. PATENT DOCUMENTS

| | | | |
|---|---|---|---|
| 7,653,249 B2 * | 1/2010 | Loui et al. | 382/224 |
| 2005/0128305 A1 * | 6/2005 | Hamasaki et al. | 348/207.99 |
| 2006/0282443 A1 * | 12/2006 | Hanagata | 707/100 |
| 2007/0208717 A1 * | 9/2007 | Matsui | 707/3 |
| 2009/0216435 A1 | 8/2009 | Zheng et al. | |
| 2010/0079613 A1 * | 4/2010 | Karimoto et al. | 348/222.1 |
| 2011/0235858 A1 * | 9/2011 | Hanson et al. | 382/103 |

FOREIGN PATENT DOCUMENTS

WO    2009070841 A1    6/2009

OTHER PUBLICATIONS

Mor Naaman, Yee Jiun Song, Andreas Paepcke, Hector Garcia-Molina. Automatic organization for digital photographs with geographic coordinates, p. 53-62.

Yu Zheng; Like Liu; Longhao Wang; Xing Xie. Learning transportation mode from raw gps data for geographic applications on the web.

Mor Naaman, Yee Jiun Song, Andreas Paepoke, Hector Garcia-Molina, Automatic organization for digital photographs with geographic coordinates, 2004, JCDL '04, pp. 53-59.

Yu Zheng, Like Liu, Longhao Wang, Xing Xie, Learning transportation mode from raw gps data for geographic applications on the web, 2008, Proceedings of the 17th International conference on World Wide Web, pp. 247-256.

* cited by examiner

*Primary Examiner* — Stephen R Koziol
*Assistant Examiner* — Jonathan S Lee
(74) *Attorney, Agent, or Firm* — Canon U.S.A., Inc. IP Division

(57) ABSTRACT

Disclosed is a method of determining one or more event subsets within a plurality of images. Each image is associated with time and location data specifying the time and location of capture of the image. The method determines a time variable for each adjacent pair of images in a capture time ordered list of the plurality of images. A distance variable for each adjacent pair of images in the ordered list of images is then determined. The method determines speed data of the image capture device at the time and location of capture of each image. The ordered list of images is then partitioned into one or more event subsets on the basis of a cost function, the cost function being determined in accordance with a normalization of the time variable and distance variable, wherein the time variable and the distance variable are weighted relative to the speed data.

18 Claims, 17 Drawing Sheets

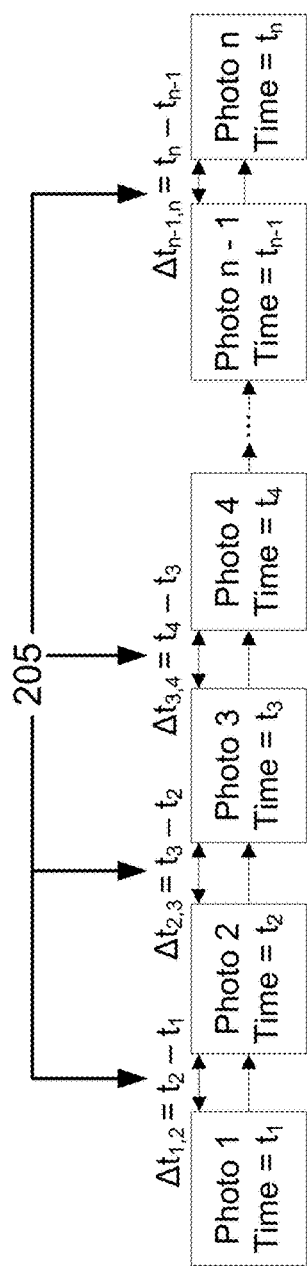
Fig. 2 [Prior Art]
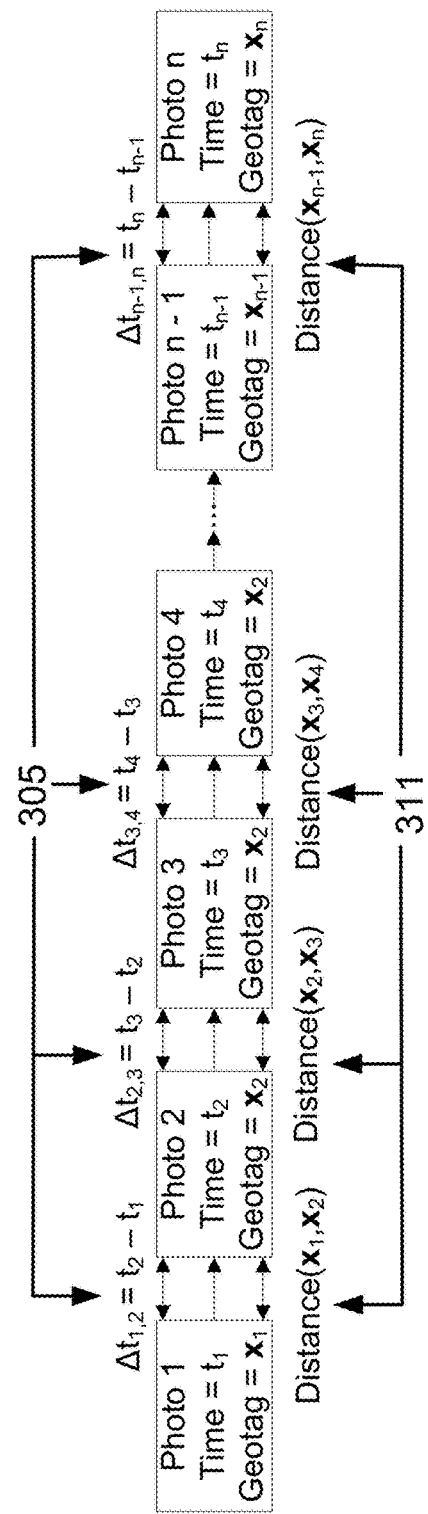
Fig. 3 [Prior Art]

IMAGE CLUSTERING METHOD

REFERENCE TO RELATED PATENT APPLICATION(S)

This application claims the benefit under 35 U.S.C. §119 of the filing date of Australian Patent Application No. 2011202609, filed 24 May 2011, hereby incorporated by reference in its entirety as if fully set forth herein.

TECHNICAL FIELD

The current invention relates to the clustering of images and, in particular, the clustering of images based on events.

BACKGROUND

Traditionally, many photo clustering algorithms rely on time information to organise photos into groups. For example, photos are often grouped by the day they were taken or by identifying significant time differences in a time ordered list of photos. While time is a key indicator for determining event boundaries—when used alone, is the value derived can be limited. For example, over the passage of one hour, a photographer could be at a new location 60 km away, or they could be in the same location. It is the extra piece of information—how far they have moved—which can distinguish whether or not a new event has occurred.

Time information is usually associated with a captured image using a timestamp generated by a real-time clock integral with the image capture device, such as a camera. Location data, sometimes known as geographical data, geodata, or a geo-tag, is typically determined using a satellite positioning/navigation device such as a Global Positioning System (GPS) device. Again, such a device may be integral with the camera. Such information when associated with the captured image is metadata, and is typically organised in an EXIF component of the JPEG (.jpg) file of the image.

Techniques for arranging photos into groups based on time and location information have been in existence for a number of years, however, cameras which supply a geo-tag as well as a timestamp have only recently come into mainstream use. Without a camera which embeds GPS information into the EXIF data of the photo, the user would be required to manually annotate GPS information into their photos or carry a GPS logger with them which would later provide GPS information for the photos by cross referencing the time stamps on the photos with the time stamps on the GPS log. Both of these methods are inconvenient and time consuming. It could be argued that the overhead of manually geo-tagging photos or cross referencing with a GPS log far exceeds the potential benefits gained by using location information for photo clustering. As a result, the overhead of geo-tagging photos has meant time and location based clustering algorithms have not been widely adopted. However, as cameras which provide a geo-tag on the photo become more popular, photo clustering algorithms which group photos using time and GPS information will become in more widespread use. As a result, with the expected proliferation of cameras which provide a geotag in the EXIF data, such information can be exploited in grouping collections of photos into events.

Current methods of event identification look at the time differences and distance differences between adjacent photos in a time ordered list of photos and attempt to identify time and distance outliers. This approach may not always be useful in situations when a photographer takes two sets of photos for the same event—one in one location and then more photos in the same location later in the day. At the boundary between the last photo from the first set and first photo from the second set, it would be considered a time outlier because of the large change in time but not a distance outlier because it was in the same area.

Other techniques seek to identify when time differences or distance difference outliers occur. A disadvantage of these approaches is that by only considering time or distance, new events can be incorrectly detected. For example, for a travel event such as photos being taken while travelling on a bus or in car, the large distance differences will be detected as outliers resulting in the travel event being erroneously broken up into multiple events. In addition, if there are short bursts of photos taken in one location but the time between bursts is considered to be an outlier—an event may be erroneously broken up into multiple events.

In addition, both of the preceding techniques cannot generate a predefined number of clusters easily. The number of clusters could be adjusted by changing the thresholds for what constitutes an outlier. However, such an approach is inconvenient and the number of clusters created cannot be easily set.

SUMMARY

Presently disclosed is a method for grouping a set of photos into events based on metadata such as time and location information associated with each photo. Time and location information are key indicators for where new events begin. In many cases, significant changes in time and/or significant changes in distance between two photos a user has taken indicate the start of new events. The method groups travel events together as well as events where photos were taken when the photographer was walking around an area.

Media objects such as photos are often grouped into events to help the user organise, review and search through them easily. Such requirements have come with the proliferation of digital photography and the large quantity of photos that people take. In the current photo album generation application, photos are grouped into events and events are labelled with useful geographical information to assist the user in recalling and identifying events from their photo collection. These features help the user in finding and choosing events from their photo collection to create a photo album. This disclosure relates to the grouping aspect of the current photo album generation software.

According to one aspect of the present disclosure, there is provided a method of determining one or more event subsets within a plurality of images. Each image is associated with time and location data specifying the time and location of capture of the image by an image capture device. The method determines a time variable for each adjacent pair of images in a capture time ordered list of the plurality of images based on the time data associated with the images of the pair. A distance variable for each adjacent pair of images in the ordered list of images is then determined based on the location data associated with the images of the pair. The method determines speed data of the image capture device at the time and location of capture of each image in the plurality of images. The ordered list of images is then partitioned into one or more event subsets on the basis of a cost function, the cost function being determined in accordance with a normalisation of the time variable and distance variable, wherein the time variable and the distance variable are weighted relative to the speed data.

Other aspects are also disclosed.

BRIEF DESCRIPTION OF THE DRAWINGS

At least one embodiment of the present invention will now be described with reference to the following drawings, in which:

FIG. 2 illustrates a prior art example of considering time differences between adjacent photos in an ordered list of photos to perform image clustering;

FIG. 3 illustrates a prior art example of considering time differences and distance differences between adjacent photos in an ordered list of photos to perform image clustering;

FIG. 10B illustrates the grouping the images into events when the weights aren't adapted according to speed. FIG. 10C illustrates the grouping of the images into events when the weights are adapted according to speed.

DETAILED DESCRIPTION INCLUDING BEST MODE

The present inventors note that time and distance are very different quantities and as such both need to undergo a transformation before they are in a state which can be merged together. If simply added together, in many cases only one quantity will ultimately be considered because it will be several orders of magnitude larger than the other quantity. The prior art has provided the present inventors with no instruction or guidance as to how these different quantities may be combined in a useful fashion.

With the proliferation of digital photography, the number of images which people take has increased significantly. However, as the number of photos taken increases, photo collections become more difficult to manage, sort through and find images. Disclosed is a method of grouping a collection of photos into recognisable events to provide organisation and assist a user in recognising different parts of their photo collection. The method is preferably used in a photo album generation application, where a user's collection is organised into events and the user selects what events to use in their photo album.

The following description discloses a system which divides a collection of photos into one or more groups corresponding to travel events. The system groups the collection of photos into suitable travel events, even where the photographer was moving at a fast speed, such as photos taken while in a car or a bus, or while walking around an area such as an amusement park or museum. In the case of detecting travel events, some prior art techniques use machine learning which require training data. The risk of requiring training data is the system can become over-fitted to the data and not general enough to produce good results on an arbitrary set of data. The current system does not require training data.

Figure 15A:
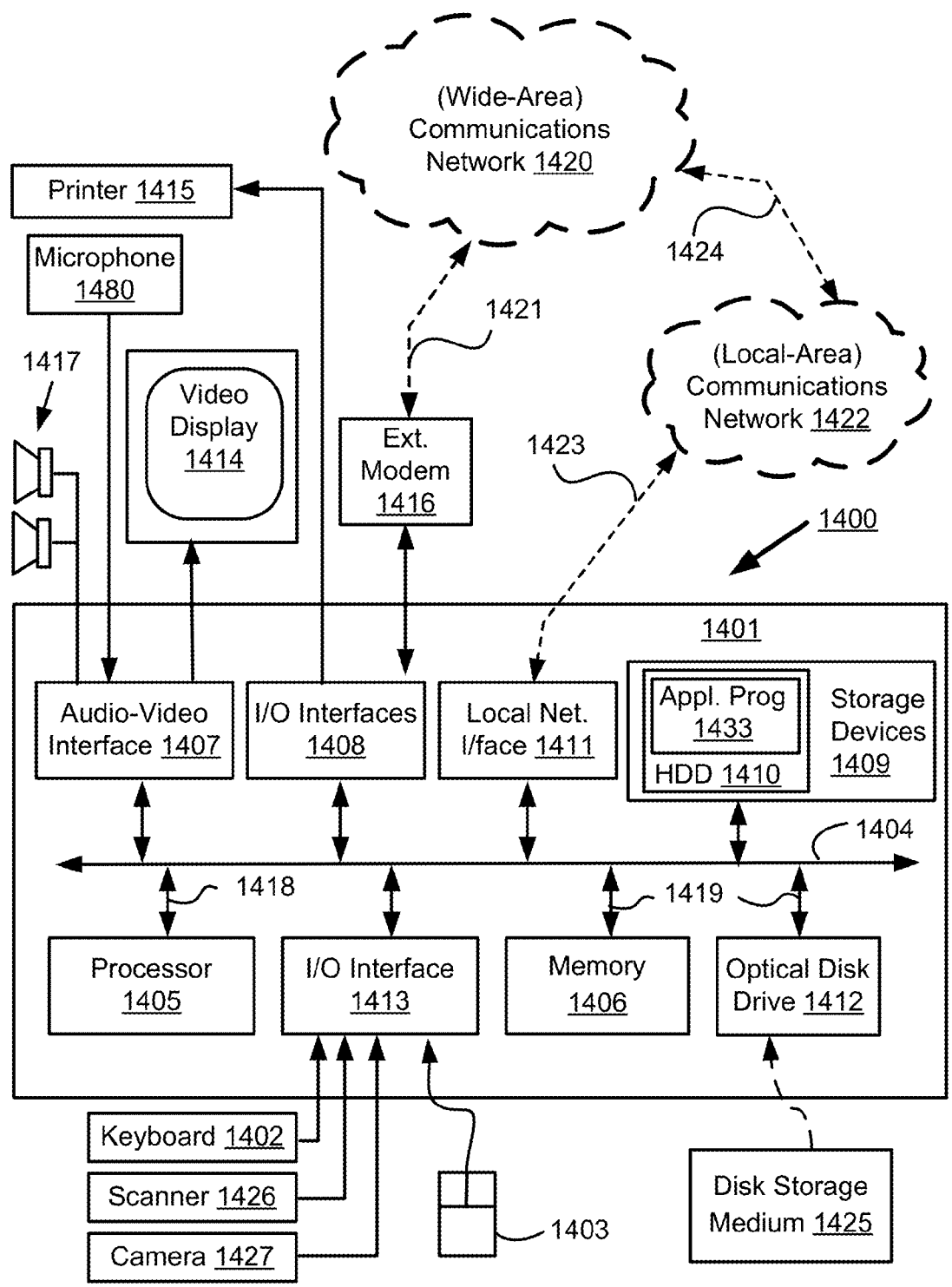
FIGS. 15A and 15B form a schematic block diagram of a general purpose computer system upon which arrangements described can be practiced.
Figure 15B:
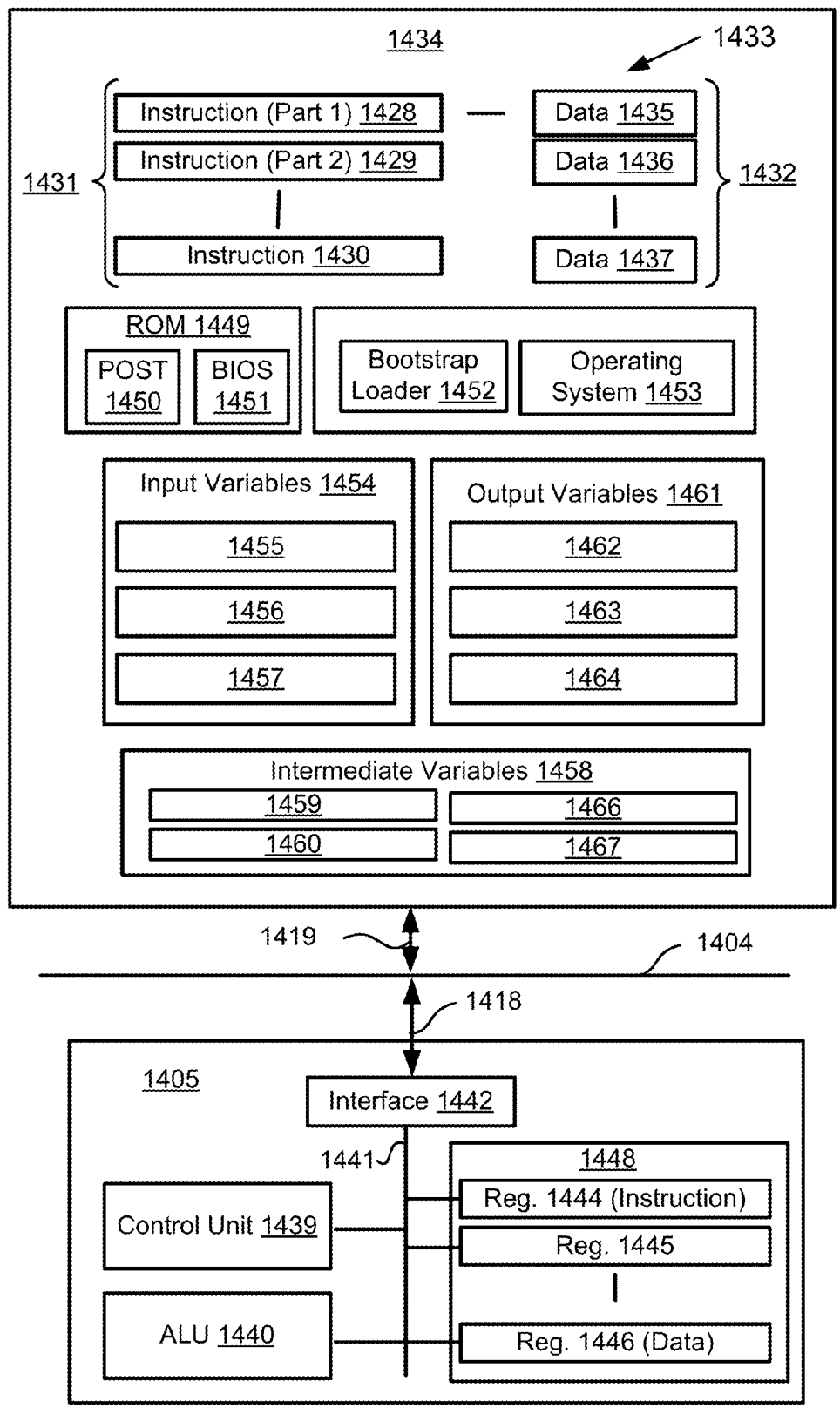

Further, whilst images are desirably captured with a camera device having a real-time clock and a GPS location device, forming a time record and GPS log, the processing to be described is typically performed in a post-processing environment, on a computer or similar system executing a photo album application to which the captured images and associated metadata is downloaded. FIGS. 15A and 15B depict a general-purpose computer system 1500, upon which the various arrangements described can be practiced.

As seen in FIG. 15A, the computer system 1500 includes: a computer module 1501; input devices such as a keyboard 1502, a mouse pointer device 1503, a scanner 1526, a camera 1527, and a microphone 1580; and output devices including a printer 1515, a display device 1514 and loudspeakers 1517. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes at least one processor unit 1505, and a memory unit 1506. For example, the memory unit 1506 may have semiconductor random access memory (RAM) and semiconductor read only memory (ROM). The computer module 1501 also includes an number of input/output (I/O) interfaces including: an audio-video interface 1507 that couples to the video display 1514, loudspeakers 1517 and microphone 1580; an I/O interface 1513 that couples to the keyboard 1502, mouse 1503, scanner 1526, camera 1527 and optionally a joystick or other human interface device (not illustrated); and an interface 1508 for the external modem 1516 and printer 1515. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 15A, the local communications network 1522 may also couple to the wide network 1520 via a connection 1524, which would typically include a so-called "firewall" device or device of similar functionality. The local network interface 1511 may comprise an Ethernet™ circuit card, a Bluetooth™ wireless arrangement or an IEEE 802.11 wireless arrangement; however, numerous other types of interfaces may be practiced for the interface 1511.

The I/O interfaces 1508 and 1513 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1500.

The components 1505 to 1513 of the computer module 1501 typically communicate via an interconnected bus 1504 and in a manner that results in a conventional mode of operation of the computer system 1500 known to those in the relevant art. For example, the processor 1505 is coupled to the system bus 1504 using a connection 1518. Likewise, the memory 1506 and optical disk drive 1512 are coupled to the system bus 1504 by connections 1519. Examples of computers on which the described arrangements can be practised include IBM-PC's and compatibles, Sun Sparcstations, Apple Mac™ or a like computer systems. In the arrangements to be described, images and metadata may be downloaded from the camera 1527 or via the networks 1520 and/or 1522 and stored in the computer 1501, such as in the HDD 1410.

The method of image clustering may be implemented using the computer system 1500 wherein the processes of FIGS. 4 to 9 and 11 to 14, to be described, may be implemented as one or more software application programs 1533 executable within the computer system 1500. In particular, the steps of the method of image clustering are effected by instructions 1531 (see FIG. 15B) in the software 1533 that are carried out within the computer system 1500. The software instructions 1531 may be formed as one or more code modules, each for performing one or more particular tasks. The software may also be divided into two separate parts, in which a first part and the corresponding code modules performs the image clustering methods and a second part and the corresponding code modules manage a user interface between the first part and the user.

The software may be stored in a computer readable medium, including the storage devices described below, for example. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous apparatus for image clustering.

The software 1533 is typically stored in the HDD 1510 or the memory 1506. The software is loaded into the computer system 1500 from a computer readable medium, and executed by the computer system 1500. Thus, for example, the software 1533 may be stored on an optically readable disk storage medium (e.g., CD-ROM) 1525 that is read by the optical disk drive 1512.

In some instances, the application programs 1533 may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533 and the corresponding code modules mentioned above may be executed to implement one or more graphical user interfaces (GUIs) to be rendered or otherwise represented upon the display 1514. Through manipulation of typically the keyboard 1502 and the mouse 1503, a user of the computer system 1500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1517 and user voice commands input via the microphone 1580.

FIG. 15B is a detailed schematic block diagram of the processor 1505 and a "memory" 1534. The memory 1534 represents a logical aggregation of all the memory modules (including the HDD 1509 and semiconductor memory 1506) that can be accessed by the computer module 1501 in FIG. 15A.

When the computer module 1501 is initially powered up, a power-on self-test (POST) program 1550 executes. The POST program 1550 is typically stored in a ROM 1549 of the semiconductor memory 1506 of FIG. 15A. A hardware device such as the ROM 1549 storing software is sometimes referred to as firmware. The POST program 1550 examines hardware within the computer module 1501 to ensure proper functioning and typically checks the processor 1505, the memory 1534 (1509, 1506), and a basic input-output systems software (BIOS) module 1551, also typically stored in the ROM 1549, for correct operation. Once the POST program 1550 has run successfully, the BIOS 1551 activates the hard disk drive 1510 of FIG. 15A. Activation of the hard disk drive 1510 causes a bootstrap loader program 1552 that is resident on the hard disk drive 1510 to execute via the processor 1505. This loads an operating system 1553 into the RAM memory 1506, upon which the operating system 1553 commences operation. The operating system 1553 is a system level application, executable by the processor 1505, to fulfil various high level functions, including processor management, memory management, device management, storage management, software application interface, and generic user interface.

The operating system 1553 manages the memory 1534 (1509, 1506) to ensure that each process or application running on the computer module 1501 has sufficient memory in which to execute without colliding with memory allocated to another process. Furthermore, the different types of memory available in the system 1500 of FIG. 15A must be used properly so that each process can run effectively. Accordingly, the aggregated memory 1534 is not intended to illustrate how particular segments of memory are allocated (unless otherwise stated), but rather to provide a general view of the memory accessible by the computer system 1500 and how such is used.

As shown in FIG. 15B, the processor 1505 includes a number of functional modules including a control unit 1539, an arithmetic logic unit (ALU) 1540, and a local or internal memory 1548, sometimes called a cache memory. The cache memory 1548 typically include a number of storage registers 1544-1546 in a register section. One or more internal busses 1541 functionally interconnect these functional modules. The processor 1505 typically also has one or more interfaces 1542 for communicating with external devices via the system bus 1504, using a connection 1518. The memory 1534 is coupled to the bus 1504 using a connection 1519.

The application program 1533 includes a sequence of instructions 1531 that may include conditional branch and loop instructions. The program 1533 may also include data 1532 which is used in execution of the program 1533. The instructions 1531 and the data 1532 are stored in memory locations 1528, 1529, 1530 and 1535, 1536, 1537, respectively. Depending upon the relative size of the instructions 1531 and the memory locations 1528-1530, a particular instruction may be stored in a single memory location as depicted by the instruction shown in the memory location 1530. Alternately, an instruction may be segmented into a number of parts each of which is stored in a separate memory location, as depicted by the instruction segments shown in the memory locations 1528 and 1529.

In general, the processor 1505 is given a set of instructions which are executed therein. The processor 1505 waits for a subsequent input, to which the processor 1505 reacts to by executing another set of instructions. Each input may be provided from one or more of a number of sources, including data generated by one or more of the input devices 1502, 1503, data received from an external source across one of the networks 1520, 1502, data retrieved from one of the storage devices 1506, 1509 or data retrieved from a storage medium 1525 inserted into the corresponding reader 1512, all depicted in FIG. 15A. The execution of a set of the instructions may in some cases result in output of data. Execution may also involve storing data or variables to the memory 1534.

The disclosed image clustering arrangements use input variables 1554, which are stored in the memory 1534 in corresponding memory locations 1555, 1556, 1557. The image clustering arrangements produce output variables 1561, which are stored in the memory 1534 in corresponding memory locations 1562, 1563, 1564. Intermediate variables 1558 may be stored in memory locations 1559, 1560, 1566 and 1567.

Referring to the processor 1505 of FIG. 15B, the registers 1544, 1545, 1546, the arithmetic logic unit (ALU) 1540, and the control unit 1539 work together to perform sequences of micro-operations needed to perform "fetch, decode, and execute" cycles for every instruction in the instruction set making up the program 1433. Each fetch, decode, and execute cycle comprises:

(a) a fetch operation, which fetches or reads an instruction 1531 from a memory location 1528, 1529, 1530;

(b) a decode operation in which the control unit 1539 determines which instruction has been fetched; and (c) an execute operation in which the control unit 1539 and/or the ALU 1540 execute the instruction.

Thereafter, a further fetch, decode, and execute cycle for the next instruction may be executed. Similarly, a store cycle may be performed by which the control unit 1539 stores or writes a value to a memory location 1532.

Each step or sub-process in the processes of FIGS. 4 to 9 and 11 to 13 is associated with one or more segments of the program 1533 and is performed by the register section 1544, 1545, 1547, the ALU 1540, and the control unit 1539 in the processor 1505 working together to perform the fetch, decode, and execute cycles for every instruction in the instruction set for the noted segments of the program 1533.

Figure 1:
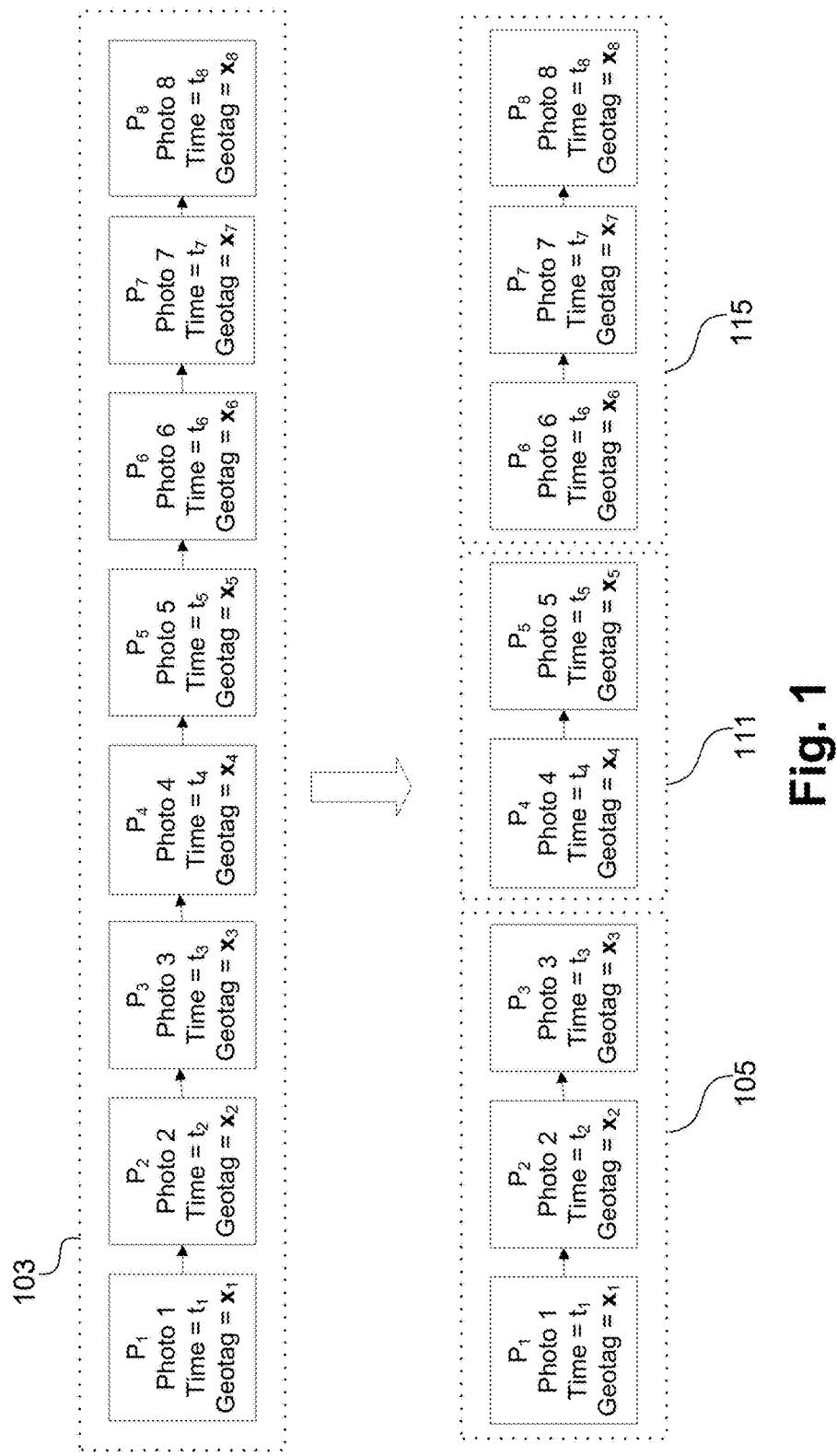
FIG. 1 is a representation of the general problem of grouping an ordered list of photos into events.

FIG. 1 shows a ordered list 103 of photographs $P_1$ to $P_8$ that may form all or part of a collection. Each of the photos has a corresponding time data ($t_n$) and location data (geotag, $x_n$) specifying the time of capture of the image and the location of capture. The general problem desired to be addressed is to cluster together, group, or form subsets of the photos in the list 103 based on events inferred from the associated time and geotag metadata. As illustrated in this example, groups 105, 111 and 115 of photos are each associated with an identifiable event, and consequently associated event boundaries.

Some prior art approaches, such as illustrated in FIG. 2, consider only time differences 205 between adjacent photos a time ordered list. The photos are broken into clusters based on time—for example by identifying significant time differences between the photos. Other prior art approaches, such as illustrated in FIG. 3, consider time differences 305 and distance differences 311 between adjacent photos. Event boundaries are found by identifying significant time and/or distance differences between adjacent photos. The distance difference is some suitable distance metric between two longitude/latitude points. The distance difference may be, for example, the geodistance (distance between two longitude/latitude points around the circumference of the earth), the $L_1$ norm or Manhattan distance ($|x_1-x_2|+|y_1-y_2|$), or the $L_2$ norm (sqrt(($x_1-x_2)^2+(y_1-y_2)^2$))).

Figure 4:
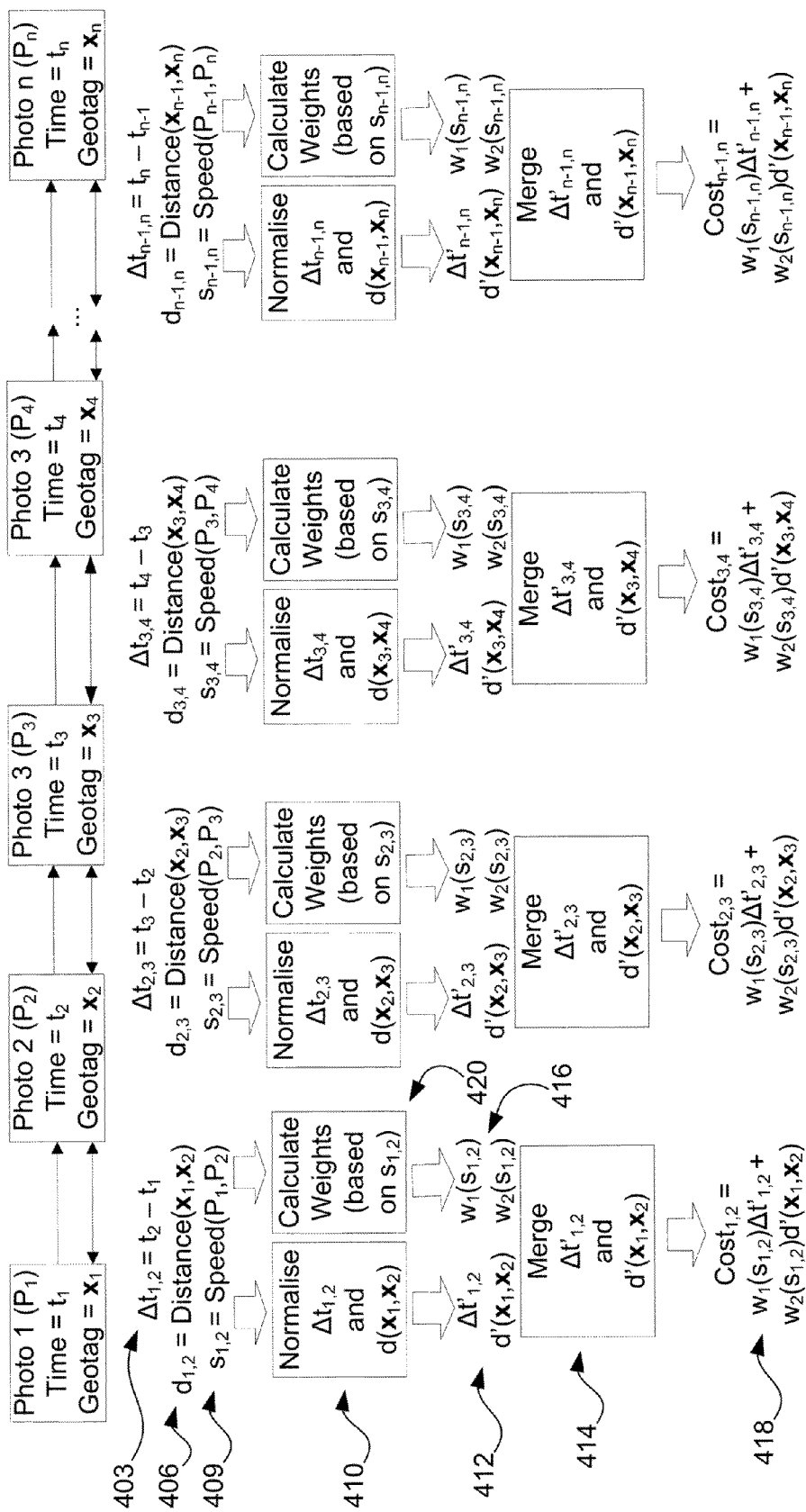
FIG. 4 is a high level diagram illustrating the approach of deriving a 'cost' (based on a weighted sum of the normalised time and distance variable and the weights are based on speed information) between adjacent photos in the ordered list.

The approach adopted according to the present disclosure is to combine the time differences and distance differences into one scalar quantity, known as a 'cost'. As seen in FIG. 4, time differences 403, distance differences 406 and speed data 409 are considered between adjacent photos in an ordered list. Time and distance are key indicators for where new events begin—the larger the change in time and/or the larger the change in distance, the more likely that a new event begins at that boundary. The time and distance differences are normalised 410 so they are in a state 412 so they can be merged 414 together. The cost 418 is a weighted sum of the normalised time and normalised distance is taken, where the weights 416 are dependent 420 on the speed data. This cost function is used to determine where event boundaries occur.

Figure 5:
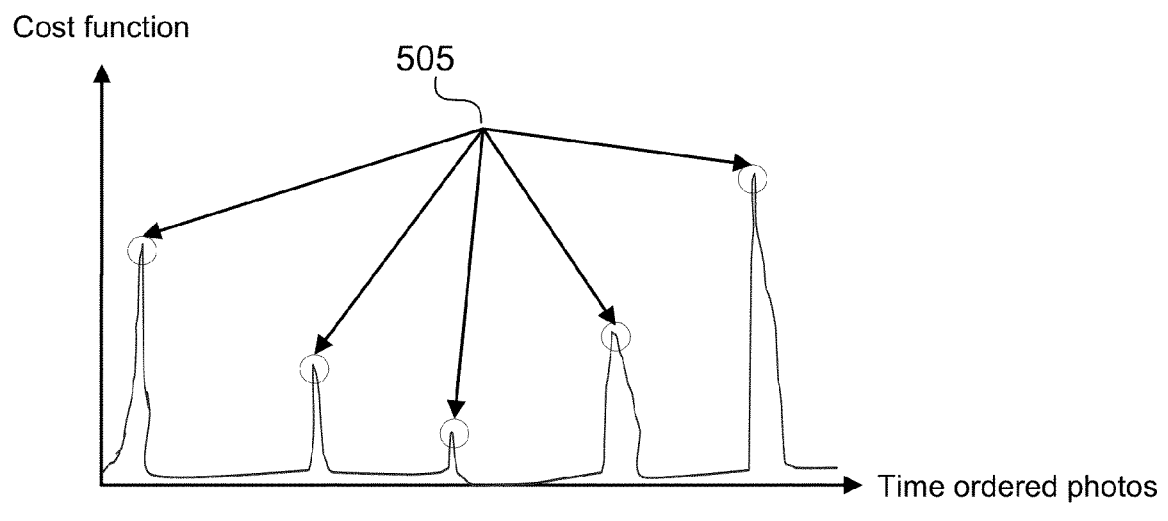
FIG. 5 is a graph illustrating an example of the 'costs' calculated between all pairs of adjacent photos in the ordered list where the peaks in the cost function correspond to the beginning of new events.

As seen in FIG. 5, the cost function has peaks 505 which correspond to the beginning of new events in the time ordered collection of photos. The present approach is to sort the photos, calculate the cost between adjacent photos and identify where the peaks occur. Peak detection may be performed using a standard peak detection method, or by identifying a predetermined number of photo clusters. At an event boundary, if the cost function is above a particular threshold, a new event is created. If it is below the threshold, the photo is assigned to the current existing cluster and no new event is created.

An advantage of considering time and distance together is that boundaries between photos can be ranked in terms of the likelihood that a new event occurs. This is advantageous as it allows the number of clusters generated to be varied.

Figure 6:
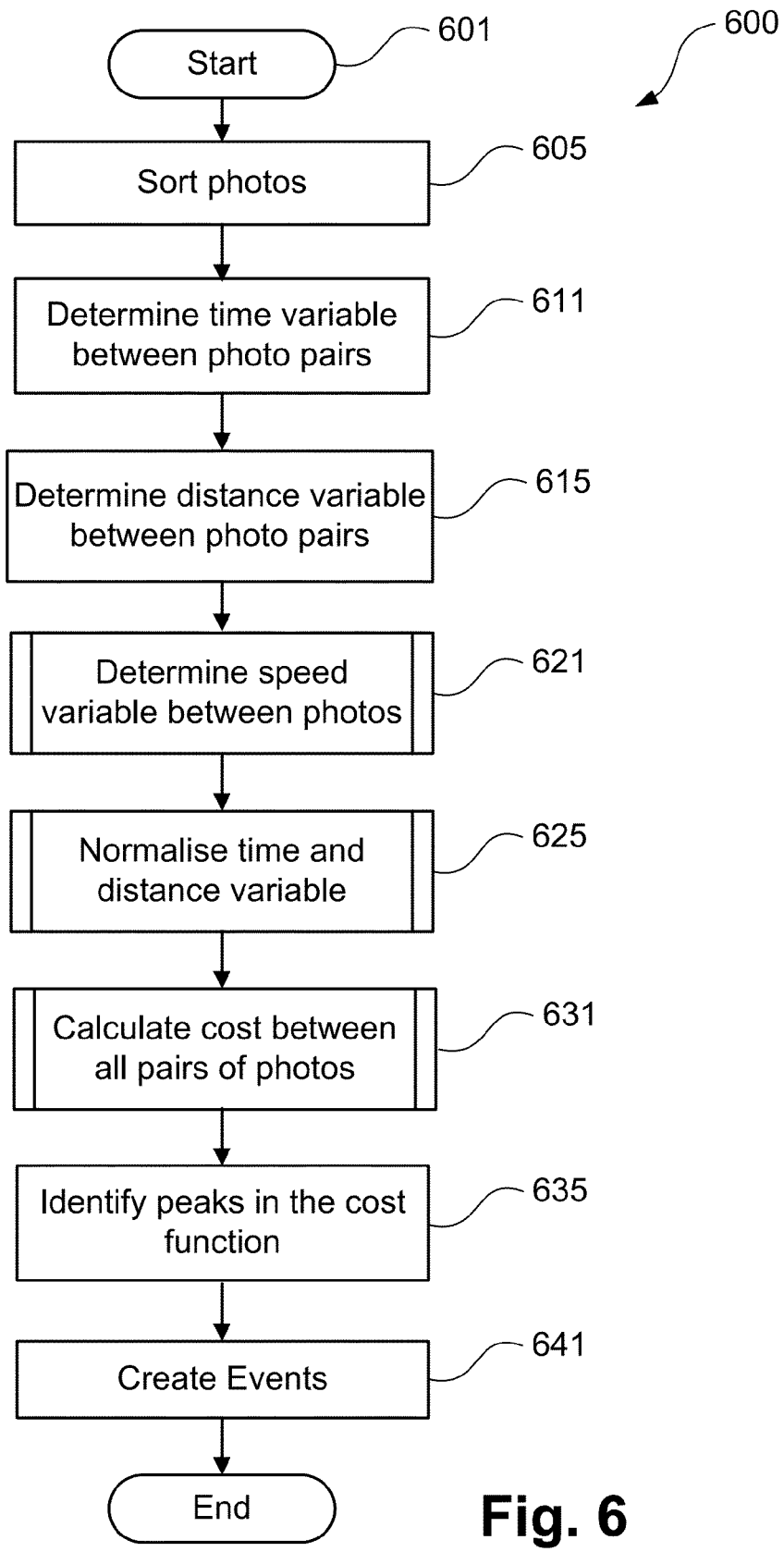
FIG. 6 is schematic flow diagram illustrating the process of detecting the start of new events using time, location and speed information.

FIG. 6 is a schematic flow diagram of a method 600 of clustering images according to the present disclosure. The method 600 is desirably implemented as software, such as the application program 1533, which may be a component of a large photo album application. The application 1533 which the method 600 is implemented may operate on a collection of photographs and associated metadata stored, for example, in the HDD 1510. The method 600 starts at step 601 where a list of photos 103, which are time stamped and geotagged, are retrieved by the processor 1505 from the HDD 1510. The photos are time sorted—such for each photo $P_j$ with time stamp $t_j$ the following relation holds for the ordering of photos:

$$P_1, P_2, \ldots, P_n \leftrightarrow t_1 \leq t_2 \leq \ldots \leq t_n.$$

The goal is to break the photos into events $E_i$—in the example of FIG. 1, three events are created:

$$E_1 = \{P_1, P_2, P_3\}105, E_2 = \{P_4, P_5\}111 \text{ and } E_3 = \{P_6, P_7, P_8\}115.$$

The clustering preserves the time ordering—all photos in a cluster are time ordered and no photo in a cluster will have a photo in a previous cluster with a larger time stamp.

The processing commences at the entry step 601 where photos are supplied or retrieved for cluster processing (clustering). Step 605 operates to check that the photos are ordered in the manner in which the photos were captured (time order). Typically the EXIF data associated with a JPEG image includes a real-time of capture and most photo management systems maintain photos in the order of capture. Further many capture devices ascribe a file name to each photo, with file name being ordered alphanumerically. Generally, automatically ascribed alphanumeric names are ordered in time order. In such instances, the photos received at step 601 will already be time ordered and so step 605 need not operate to sort the photos. However photos are sometimes supplied randomly or ordered in some other fashion. For example, a user may have edited the file names of photo images thereby obviating any automatically ascribed alphanumeric ordering, or the photos may be ordered according to some other parameter, such as the distance the photographer has moved from a reference point or any other suitable metric. In such cases, step 605 operates to sort the received photos according to a characteristic of the photos into a list arranged according to time order of capture of each photo.

In a following step 611, a time variable between adjacent photos is calculated by the processor 1405 and stored in the memory 1406. This is typically the simple difference between the time stamps of adjacent photos in the ordered list. The time variable may however also include some optional processing to increase the likelihood of achieving a particular result. For example, time differences below 15 minutes may be scaled to zero so they are more likely to be grouped together. Time differences which are 24 hours or more may also clamped at 24 hours to reduce the dynamic range of the data.

Concretely, in a preferred implementation:

$$t_{scaled}(t) = \begin{cases} 0 & \text{if } t < 15 \text{ minutes} \\ t - 15 \text{ minutes} & \text{if } t \geq 15 \text{ minutes and } t \leq 24 \text{ hours} \\ 24 \text{ hours} - 15 \text{ minutes} & \text{if } t \geq 24 \text{ hours} \end{cases}$$

The processing of step 611 is not limited to the operations performed above. For example, the time values in a certain range could be scaled. Also, other suitable scalings could be performed in alternate implementations.

A distance variable between adjacent photos is then calculated in step 615 by the processor 1405 with the value being stored in the memory 1406. In a preferred implementation, the geo-distance (distance between two longitude/latitude points along the circumference of the earth) is used. That is, the distance between two longitude/latitude points: $l_1 = (lat_1, long_1), l_2 = (lat_2, long_2)$ geo-distance = $\cos^{-1}(\sin(lat_1)\sin(lat_2) + \cos(lat_1)\cos(lat_2)\cos(long_2 - long_1)) \times$ radius of earth Other implementations may use the mean squared distance between the longitude/latitude points, or any suitable distance metric. The distance variable can have some optional scaling, like the time variable. For example, in the current embodiment, any time variables equal to or greater than 20 km are clamped at 20 km.

Figure 8:
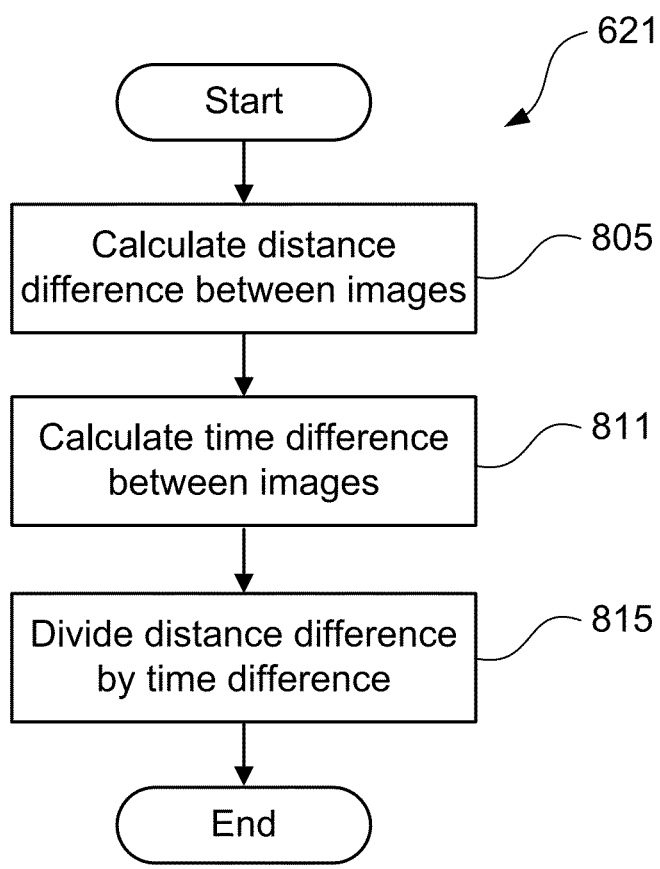
FIG. 8 is schematic flow diagram illustrating a process of calculating the speed variable.
Figure 9:
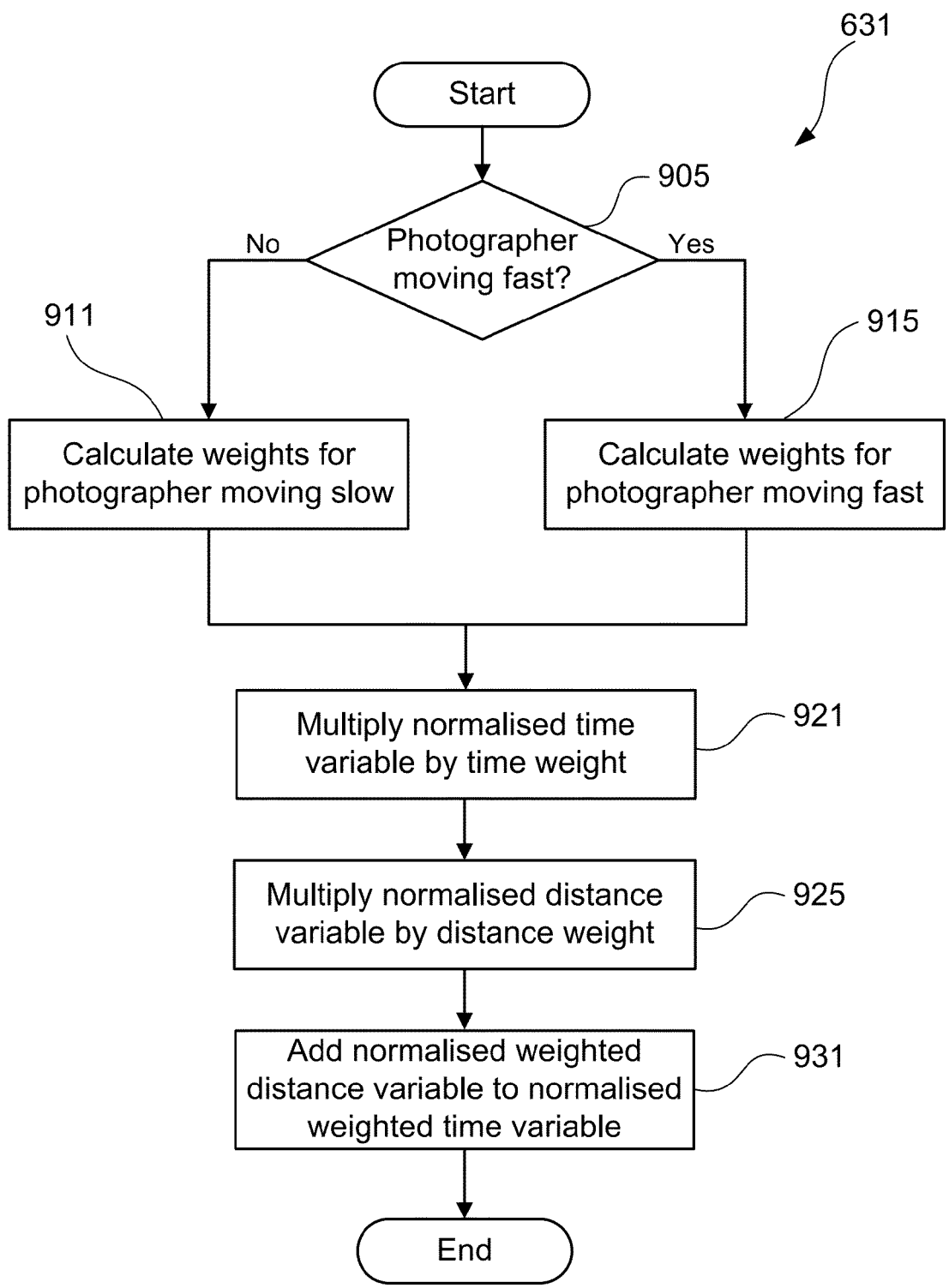
FIG. 9 is schematic flow diagram illustrating a process of calculating the cost function.

In step 621, the processor 1405 calculates a speed variable between adjacent pairs of photos. In the preferred implementation, this is the distance variable divided by the time variable:

$$v_{av} = \frac{\Delta x}{\Delta t},$$

giving an estimate of the average speed the photographer/photo capture device (camera 1527) was moving in between adjacent photos. A preferred process of deriving or calculating the speed data is illustrated in FIG. 8. Initially in step 805, a distance between two adjacent photos is retrieved by the processor 1505 from the memory 1506, having distance having been determined in step 615. In step 811, the time difference, as determined in step 611, is similarly retrieved. In step 815, the processor 1505 divides the distance difference by the time difference to estimate the average speed of the photographer between the photos. This method of estimating speed is simple, and was found by the present inventors to be effective on the photo collections tested. If more accuracy is required, could the method may be improved, for example, by periodically sampling the position of the photographer, calculating the speed between samplings and averaging the speed values between photos. Also, the speed variable does not need to be calculated from the data available. The speed variable for example may be determined with the camera capture device 1527 and stored in EXIF data within the JPEG file for an image. The EXIF data may be customised according to the specific application, or such may be included in future JPEG standards. This may therefore represent a speed variable dependent on the speed of the photographer/image capture device when the photos were taken and/or in between photos. Further, the camera 1527 may maintain a log of GPS coordinate positions of the location of the camera 1527 over time from which a more accurate speed variable could be calculated. Such a speed logging device may simply transmit the speed data, or a speed value determined from the logged speed data, for receipt by the application.

The time and distance variables acquired are very different quantities. According to standardised units, one is in meters and the other is in seconds. The variables cannot be easily merged together. If they are simply added, it is likely that one set of data will be several orders of magnitude larger than the other and dominate the cost function. Accordingly, in step 625, both sets of data are normalised to a similar scale by the processor 1505. In a preferred implementation, mean-variance normalisation is used to move or place each of time and distance onto the same scale.

Figure 7:
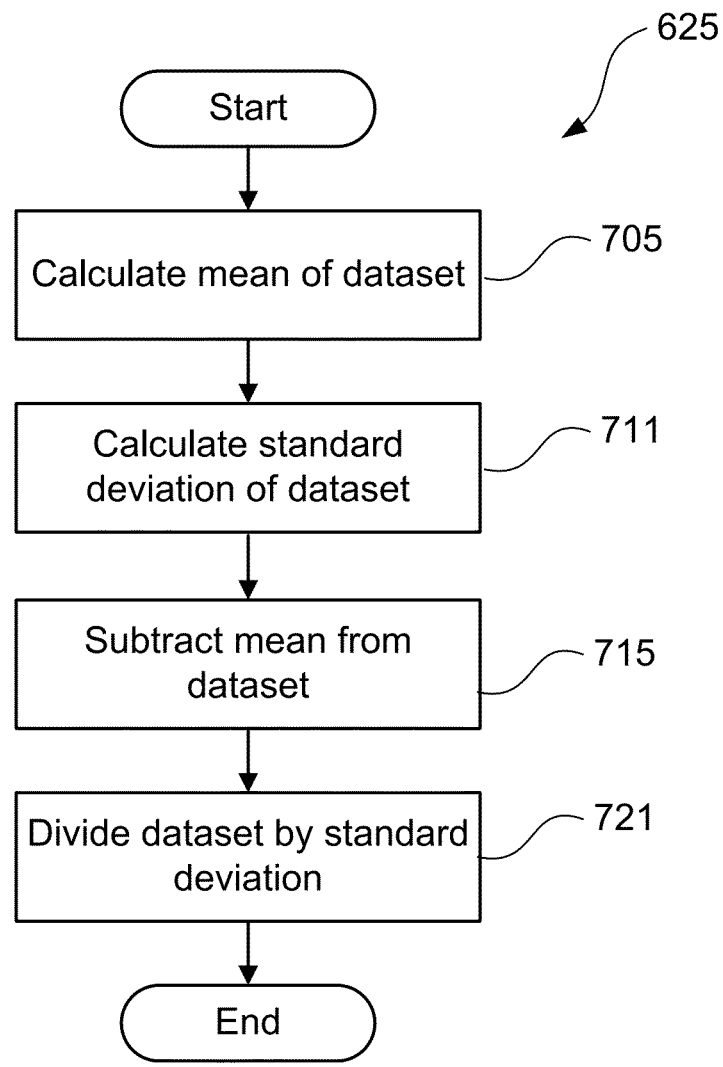
FIG. 7 is schematic flow diagram illustrating a process of mean-variance normalisation.

FIG. 7 shows this preferred implementation of step 625. In mean-variance normalisation, step 705 calculates the mean of the dataset and step 711 calculates the standard deviation of the dataset. In the current implementation, a mean and standard deviation for each of the set of time variables and the set of distance variables is calculated. Each time mean and distance mean is subtracted from each element in the corresponding dataset in step 715, and each element in the dataset is then divided by corresponding the time or distance standard deviation in step 721. This moves the time and distance data so each are on a similar scale. Other techniques for moving datasets onto the same scale could be used in other implementations. Such techniques include feature warping, histogram equalisation or maximum a posteriori (MAP) adaptation. For some datasets it may be necessary to subtract in the minimum value of each normalised dataset so all the time and distance values are positive.

Dividing each dataset by its maximum value will not produce good results because such methods are not robust to outliers. Many photo collections will contain time and distance difference outliers—for example if they contain photos which are days apart or taken at opposite ends of the globe. Even though the time differences may be clamped from the optional scaling previously mentioned, there is still large variability in the datasets. If the values for the clamps were any lower, the variability would be reduced but there is risk that the dynamic range is compressed so much, it will be harder to detect when a new event occurs.

Returning to FIG. 6, once the datasets are normalised, the cost function is then calculated in step 631. The cost function is a weighted sum of the normalised time variable and the normalised distance variable and is detailed in FIG. 9. Initially a decision step 905 is actioned by the processor 1505 to determine if the photographer or camera 1527 was moving fast, or conversely slowly, in between when the photos were taken. If step 905 determines the photographer was moving slowly (No), step 911 is executed where the cost function is weighted as 10% towards the normalised time variable and 90% towards the normalised distance variable. If the photographer is moving fast (Yes), step 915 is executed where the cost function is weighted purely towards time. In this fashion, the time variable and the distance variable are weighted relative to the speed data. This is to prevent travel events from being broken up into multiple events because of the large changes in distance. The weights may be varied for other implementations.

Step 921 follows where the normalised time variable is multiplied by the time weight, and then step 925 where the normalised distance variable is multiplied by the distance weight. The multiples are then added together to create the cost in step 931.

So concretely:

$$\text{Cost}_{i+1,i} = w_1 \theta_{normalise}(t_{i+1} - t_i) + w_2 \Theta_{normalise}(\text{distance}(x_{i+1}, x_i))$$

where $\theta_{normalise}$ is the function for normalising the time variables, $\Theta_{normalise}$ is the function for normalising the distance variables and distance$(x_{i+1}, x_i)$ is the distance metric between two longitude/latitude points—the geodistance in the current embodiment. When the photographer is moving fast (travel events), 100% of the normalised time variable and 0% of the normalised distance variable is used. Concretely, the weight variables are:

$$(w_1, w_2) = \begin{cases} (0.1, 0.9) & \text{if speed\_class = slow} \\ (1.0, 0.0) & \text{if speed\_class = fast.} \end{cases}$$

Other weights could be used in other implementations. A photographer may be deemed to be moving fast if the speed variable exceeded 10 ms$^{-1}$, and moving slow otherwise. That is:

$$\text{speed\_class} = \begin{cases} \text{fast} & \text{if } v_{av} \geq 10 \text{ ms}^{-1} \\ \text{slow} & \text{otherwise.} \end{cases}$$

Any suitable threshold for the speed variable for determination of a travel event may be used in other implementations. Other implementations could have more complex relationships between the weights used and velocity. Once the cost has been derived for all pairs of adjacent photos, the peaks (e.g. peaks 505 in FIG. 5) are then detected at step 635. The peaks indicate where new events occur. With the peaks identified in step 635, step 641 can then operate to create an event by partitioning the ordered list of photographs at the peaks with each event corresponding to a subset or cluster of photos between adjacent peaks.

A standard technique could be used for identifying peaks in the cost function. In the preferred implementation, for the user may stipulate a certain number of events, suitable for a desired workflow. In a sense, the number of events can be arbitrary. For example, a birthday party could have a number of sub-events—people in the pool, cutting the cake and people playing games. This birthday party could be broken up into 1, 2 or 3 events. The preferred implementation aims to generate approximately 1.2-1.4 clusters on average per day of photos. This value or range of values may be changed for other implementations.

For the preferred implementations, an estimate is made of the number of clusters, N, and the costs are then sorted. The Nth largest cost is selected to establish a threshold:

threshold=sorted_costs_descending_order[N].

To estimate N, the cumulative cost is calculated:

cumulative_cost[$n$]=sorted_costs_ascending[$n$]+cumulative_cost[$n-1$].

The point is found at which the cumulative cost reaches 99.9% of its final value and that point is used as the threshold for what determines a new event. Other parameters other than 99.9% could be used in other implementations. If this threshold results in less than 1.2 clusters on average per day being created, the threshold is adjusted so 1.2 clusters on average per day are created at least. If more than 1.4 clusters on average per day are created, the threshold is adjusted so that no more than 1.4 clusters on average per day are created. If the number of clusters per day created is in the range 1.2 to 1.4, the threshold is not adjusted. If the cost between two photos is above the threshold, a new event is started. Otherwise the photo is placed in a previous photo cluster. Once the costs and a threshold are determined, the events can be created. Every time a cost is above a threshold, a new event will be created. It should be noted with this approach, if it is essential that travel events are solely grouped together and not joined to the previous or next cluster, a new cluster should be forced between when the speed variable transitions between fast and slow, and slow and fast. This is a precaution in case the cost function is below the threshold at the beginning or end of the travel event.

Figure 10A:
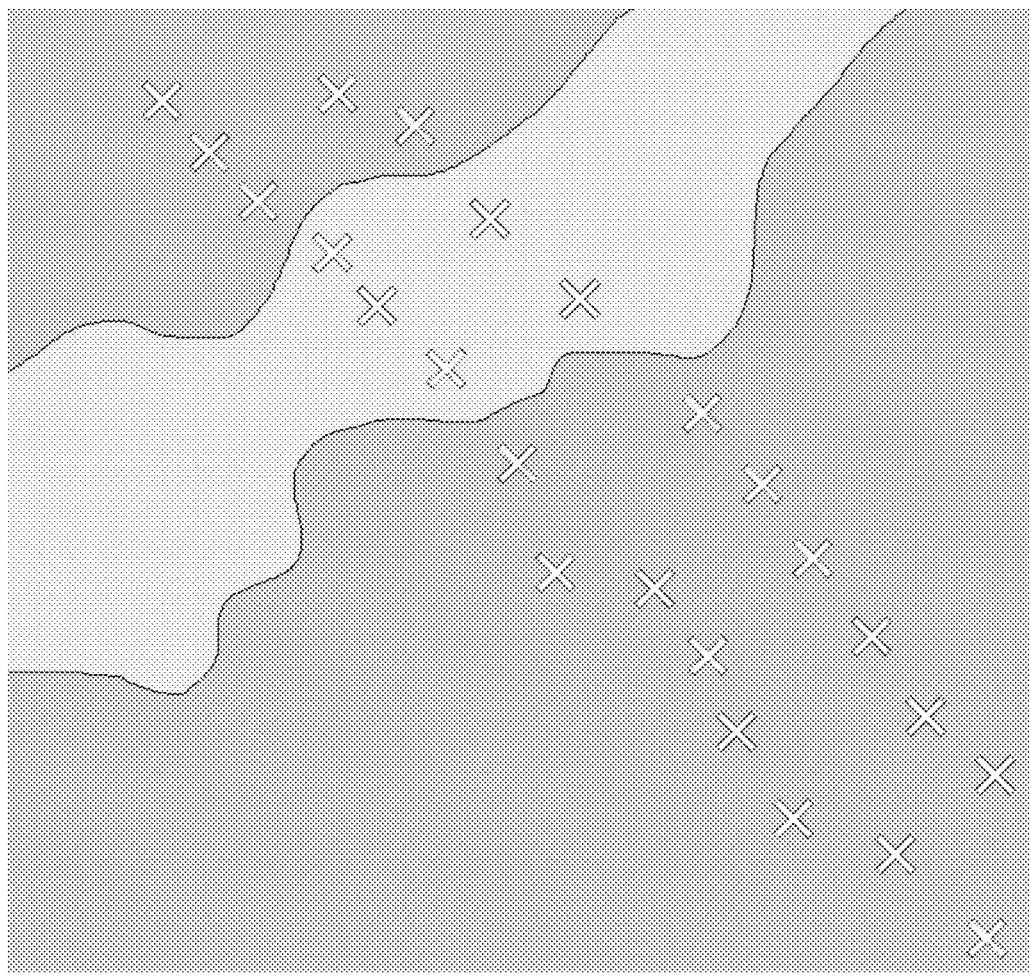
FIG. 10A, 10B and 10C are illustrations of a set of locations of images taken on two aeroplane trips.
Figure 10B:
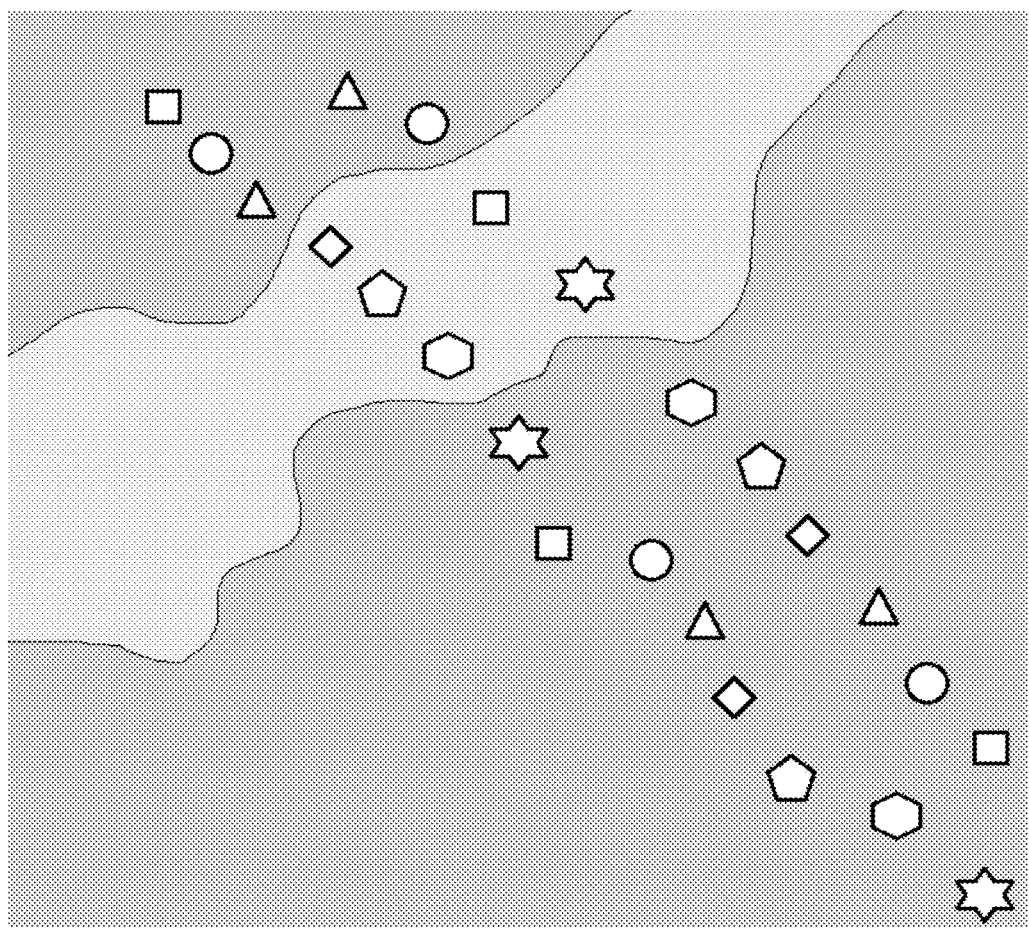
Figure 10C:
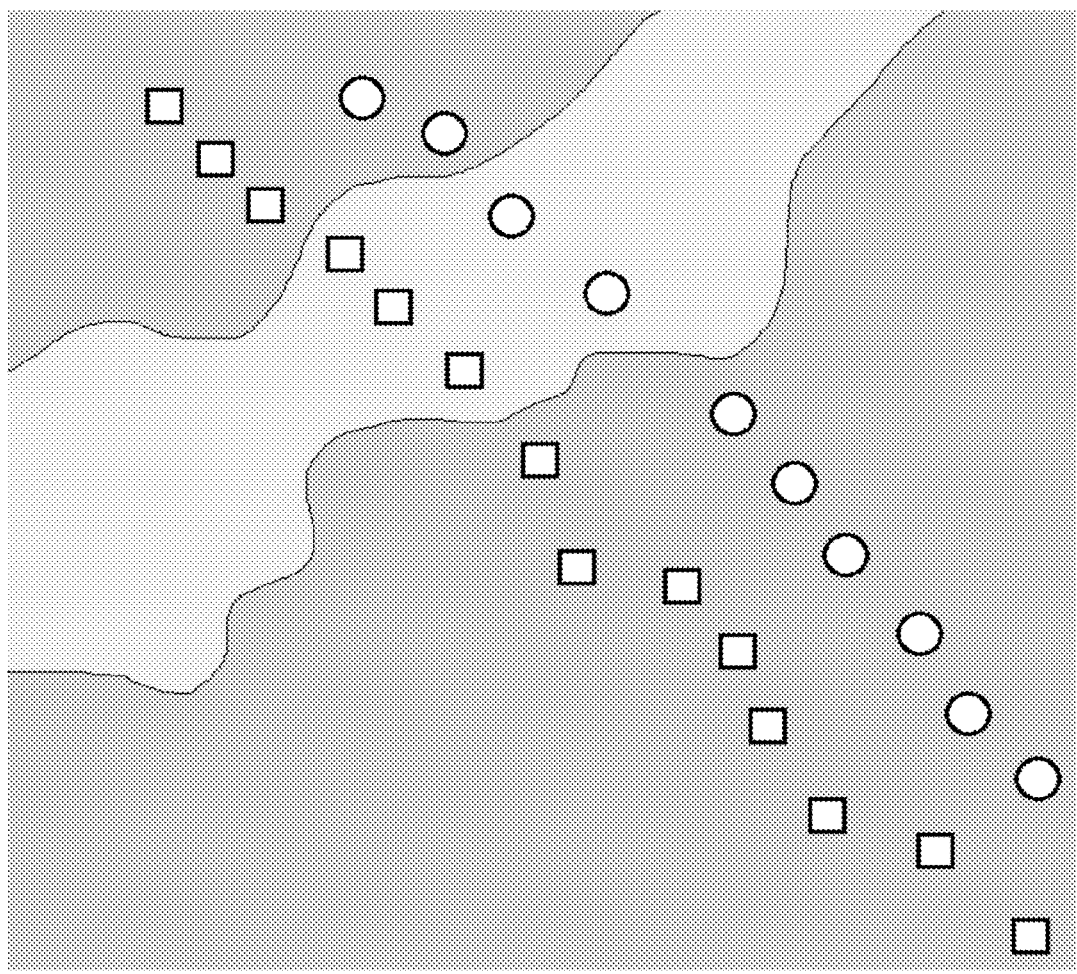

In one case, an embodiment of the invention was applied to a test image set with and without the weights being adapted according to speed. The test image set consists of photos taken on two plane trips. The photo locations are shown in FIG. 10A—each image location is represented by a cross. If the weights are not adapted according to speed, each plane trip is broken into multiple events—as illustrated in FIG. 10B (each different shape represents a different event—it should be noted, however, that the set of shapes repeats). If the weights are adapted according to speed, as per the current invention, the photos are grouped correctly—into the two flight paths, ie the two travel events, as illustrated in FIG. 10C. One flight path is represented by the squares and the other flight path is represented by the circles.

Figure 11:
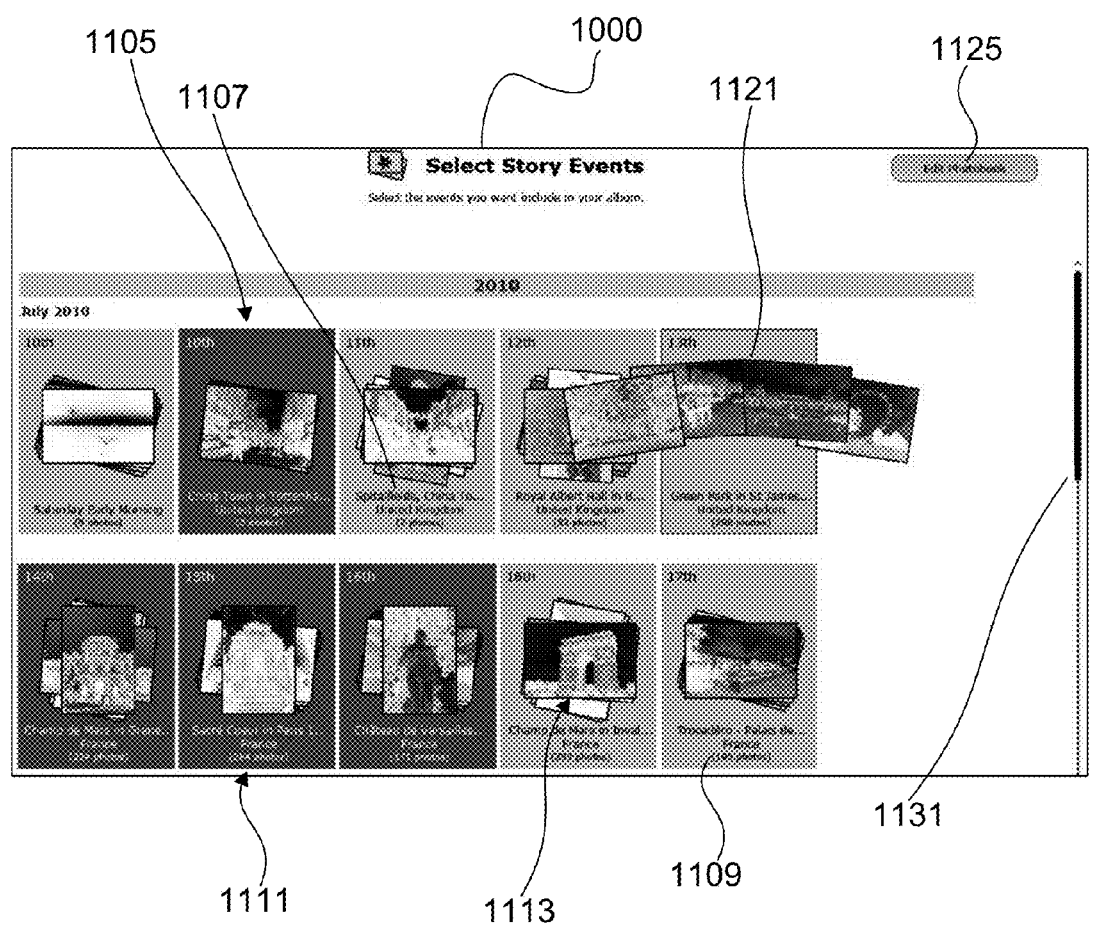
FIG. 11 is a screenshot of the first screen a user encounters when using an image clustering application according to the present disclosure, which displays a user's photo collection grouped into events.

FIG. 11 is a screenshot of a GUI 1000 reproduced on the display 1514 from photo album generation software where the clustering methods presently described may be used. The photo clustering algorithm described herein is used to group the images into events 1105. The entire user's photo stream or collection is broken into events and labelled with useful geographical information (representative text), such as the exemplary text 1107, to assist the user in identifying the events. The number of photos in each event is desirably displayed below the representative text—for example identified at 1109 is 185 photos at the Trocadero. The user may select those events they want to include in their photo album. The selected events are highlighted, indicated by the darker shading 1111 of the $10^{th}$, $14^{th}$, $15^{th}$ and $16^{th}$ events. Some representative photos, for example the photo 1013, from the user's photo album are selected and displayed above the representative text 1107. When the user moves the mouse 1503 over a group of representative photos, the photos 'fan out' or 'spread' in an animation. A result of such a 'fan out' is displayed 1121. If there are additional events, they can be viewed by using the scrollbar 1131.

Figure 12:
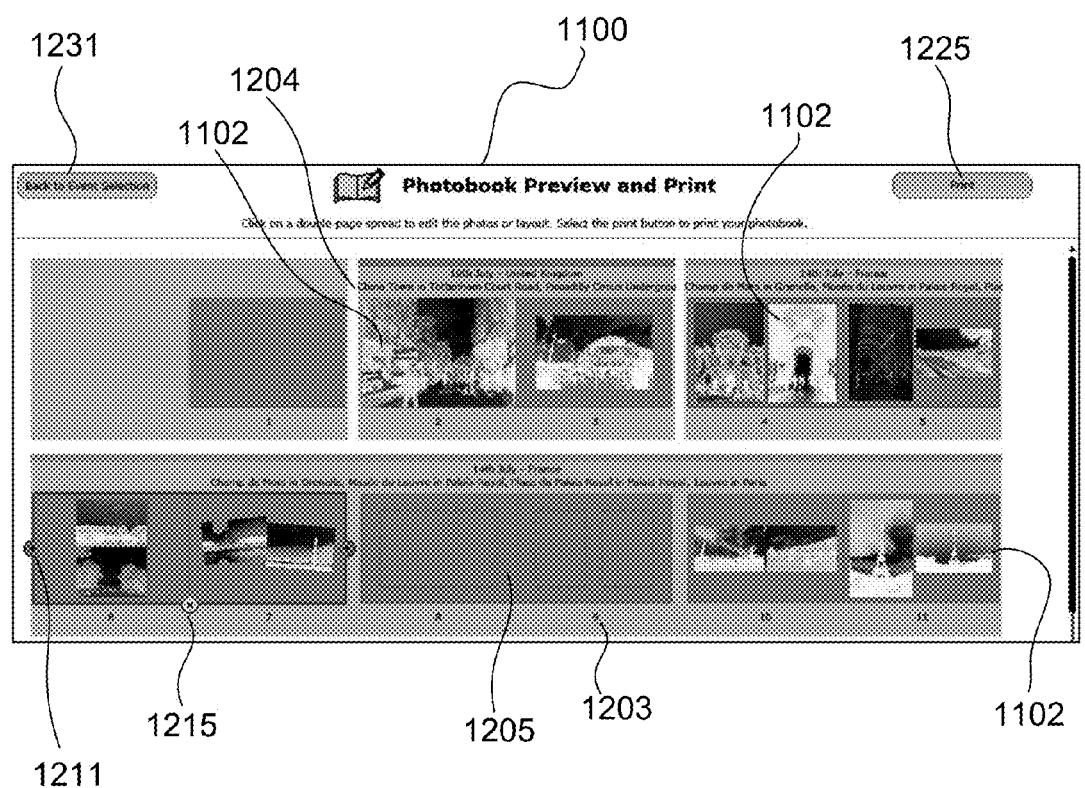
FIG. 12 is screenshot of the second screen where the user can specify how many spreads will be used and which events will be used in what spreads.

When the user has selected the events they want included in the photobook or photo album, the user selects the icon 'Edit Photobook' 1125, using the mouse 1503 for example, which leads to the GUI screen 1200 displayed in FIG. 12. A suggested photobook is already laid out for the user. The pages numbers of the photobook are displayed below the corresponding page—for example 1203. Representative text 1204 describing the event from which the photos were captured is displayed above the corresponding spread(s) 1202. The user can add additional pages 1205 by moving the mouse over a spread and clicking a '+' icon 1211, for example. The user can delete a spread by clicking an 'x' icon 1215. The user can print the photobook by clicking a 'Print' icon 1225. The user can move back to the event selection screen (FIG. 11) by clicking 'Back to Event Selection' icon 1231.

Figure 13:
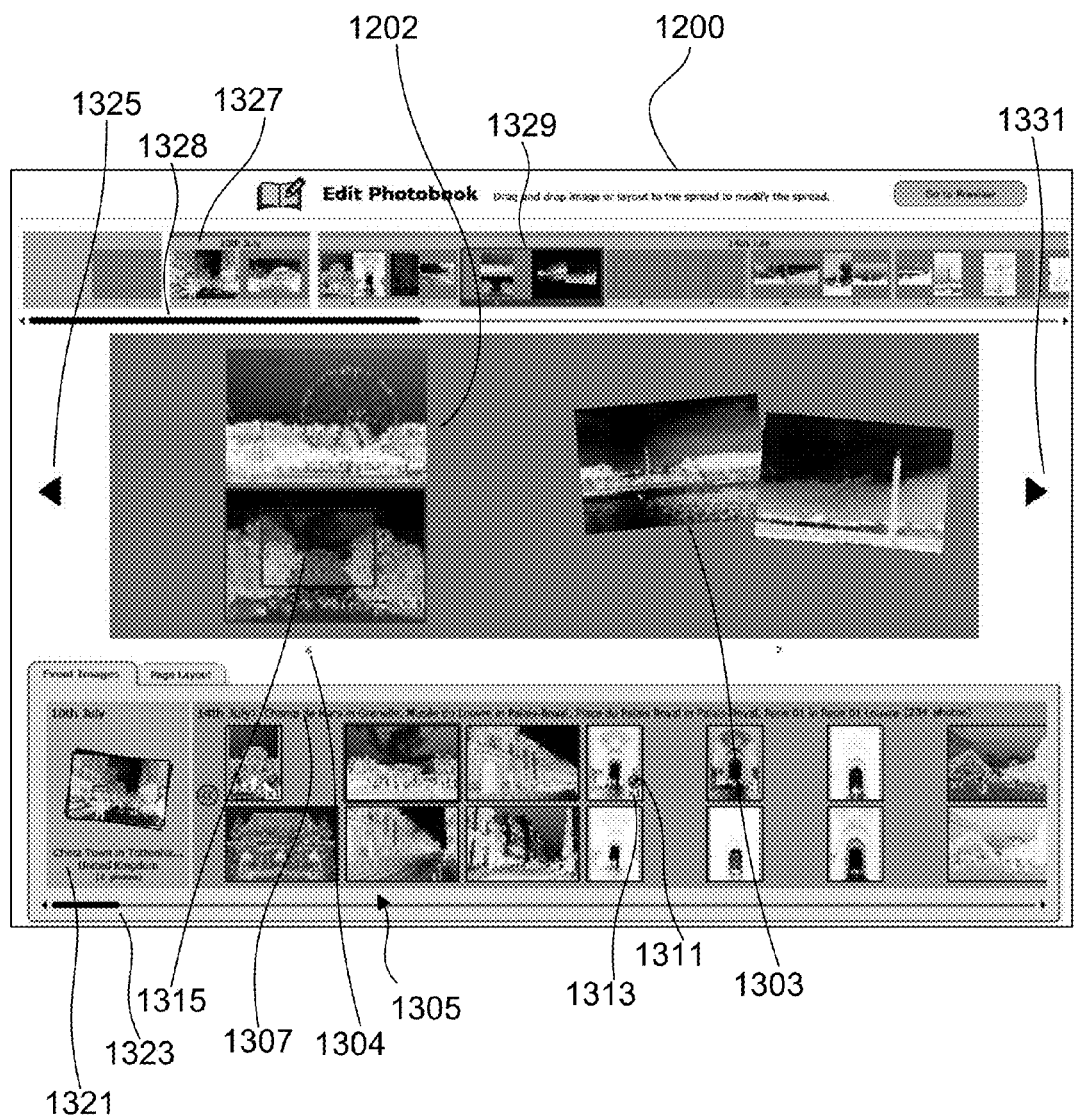
FIG. 13 is a screenshot of the third screen where the user selects what images are used in the spreads.

The user can edit a spread by clicking on the spread which causes a GUI 1300 as seen in FIG. 13 to be displayed. This causes particular pages of the photobook associated with the selected spread to be displayed upon the display 1514. The pages are laid out according to a recommended layout 1302 and with representative images, such as images 1303, for example. Page numbers 1304 are preferably displayed below the spread, and a list of photos 1305 from the event corresponding to the current spread is displayed beneath the page layout 1302. The representative text 1307 for the event is displayed above the list 1305. The photos which are selected contain a tick '✓' 1311. The number of times the photo has been used may also be displayed, for example as seen at 1313. In this example, the photo has been used once so is labelled with 'x1'. Photos in the spread can be replaced by selecting a photo from the event with the mouse 1503 and dragging and dropping the selected photo on top of the photo 1315 which is to be replaced. Photos from other events can be selected by clicking on the event 1321 and selecting a photo in a similar way. Other events can be found by using the scrollbar 1323.

Different spreads can be chosen by using a top panel 1327 and more can be found using a scrollbar 1328 to extend the top panel 1327. The selected spread 1329 is highlighted in the top panel 1327 by darker shading. The user can move to the previous spread by clicking an icon '<' 1325 and to the next spread by clicking icon '>' 1331.

Figure 14:
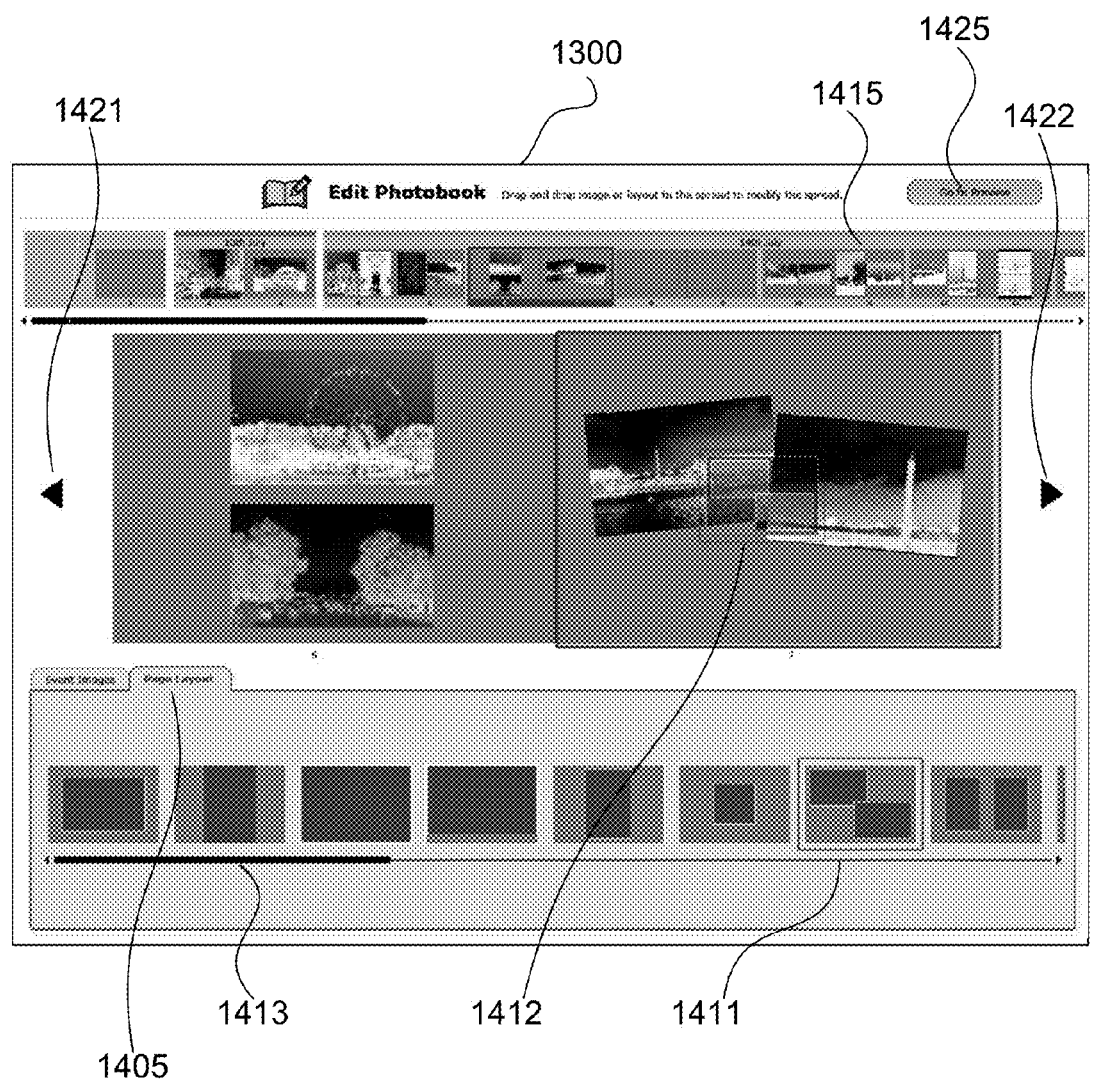
FIG. 14 is also a screenshot of the third screen, showing how to modify the layout of the images.

The template upon which the images are laid out may be modified using a GUI display 1400 seen in FIG. 14. The template for the photos can be changed by selecting a page layout tab 1405 and dragging 1411 and dropping 1412 an alternate template onto the page layout. More layouts for the page can be found by using the scrollbar 1413. Different spreads can be selected from a top panel 1415. The previous spread can be chosen by clicking a back-arrow icon 1421 and the next spread can be selected by clicking a forward arrow icon 1422. The user can move back to the previous screen by clicking an icon 1425.

Whilst there are some prior techniques which take into account time and location information in the clustering, however, no method has been identified that successfully groups a travel event together as well as correctly segmenting photos when the photographer was moving fast or moving around an area slowly. The arrangements present described provide for detecting travel events without the use of machine learning techniques and thus do not require training data. Further, the arrangements accommodate the situations where the photographer moves slowly around an area taking photos thus causing modest changes in distance over a relatively short period of time. Such may be applicable to attendance at a zoological park or a county fair where various attractions may be captured at disparate but generally proximate locations, over a possibly extended period of time, such as a few hours or a day.

INDUSTRIAL APPLICABILITY

The arrangements described are applicable to the computer and data processing industries and particularly for the management of photographs forming a collection and for the segmenting and clustering of photographs associated with identifiable events.

The foregoing describes only some embodiments of the present invention, and modifications and/or changes can be made thereto without departing from the scope and spirit of the invention, the embodiments being illustrative and not restrictive.

The invention claimed is:

1. A method of determining one or more event subsets within a plurality of images, each image being associated with time and location data specifying the time and location of capture of the image by an image capture device, said method comprising:
   determining a time variable for each adjacent pair of images in a capture time ordered list of the plurality of images based on the time data associated with the images of the pair;
   determining a distance variable for each adjacent pair of images in the ordered list of images based on the location data associated with the images of the pair;
   generating speed data of the image capture at the time and location of capture of each image in the plurality of images; and
   partitioning the ordered list of images into one or more event subsets on the basis of a cost function, said cost function being determined in accordance with a normalisation of the time variable and distance variable, wherein the time variable and the distance variable are weighted using the speed data.

2. A method according to claim 1, wherein the step of determining speed data comprises at least one of:
(i) calculating the speed data from metadata associated with the images; and
(ii) receiving the speed data from a speed logging device.

3. A method according to claim 1 wherein the time variable is weighted more than the distance variable when the speed of the image capture device is over a predetermined threshold, and the distance variable is weighted more than the time variable when the speed of the image capture device is below the predetermined threshold.

4. A method according to claim 1 wherein the weighting comprises a selection between the time or distance.

5. A method according to claim 4 wherein the weighting is 90% distance and 10% time when the speed data is below a speed threshold and 100% time when the speed data is above the speed threshold.

6. A method according to claim 1 wherein the speed data is determined from the time variable and the distance variable.

7. A method according to claim 1 further comprising the step of ordering the plurality of images by a characteristic of the images to produce the capture time ordered list of images.

8. A method according to claim 7 wherein the characteristic of the image is at least one of time of capture, file name, and distance from a reference point.

9. A method according to claim 1 wherein the speed data is derived from at least one of periodic sampling of speed information or a GPS log of the location of the camera.

10. A method according to claim 1 wherein the cost function is a weighted average of the time variable and the distance variable.

11. A method according to claim 10, wherein weights for the weighted average of the time variable and the distance variable are derived from the speed data.

12. A method according to claim 1 wherein the images are partitioned into the subsets based on a cost threshold such that where the cost function associated with an image is above the threshold, a new partitioned subset is created, and where the cost function is below the cost threshold, the image is assigned to an existing subset.

13. A method according to claim 1 wherein the time variable and the distance variable are derived from adjacent images in the ordered set of images.

14. A method according to claim 13 wherein the time variable comprises a time difference between the adjacent images, and the distance variable comprises a distance metric between the adjacent images.

15. A method according to claim 1, wherein the speed data is derived from at least one of the speed of the photographer and the speed of the image capture device between the two images, and the speed of the image capture device when the image was taken.

16. A method according to claim 1 wherein the normalisation comprises one of mean-variance normalisation, feature warping, histogram equalisation or maximum a posteriori (MAP) adaptation.

17. A computer readable non-transitory storage medium having a computer program recorded thereon, the program being executable by computerised apparatus to perform the method of claim 1.

18. An image processing apparatus for determining one or more event subsets within a plurality of images, each image being associated with time and location data specifying the time and location of capture of the image by an image capture device, the image processing apparatus comprising a processor and a memory associated with the processor, the memory having recorded thereon a program executable by the processor, the program comprising:
code for determining a time variable for each adjacent pair of images in a capture time ordered list of the plurality of images based on the time data associated with the images of the pair;
code for determining a distance variable for each adjacent pair of images in the ordered list of images based on the location data associated with the images of the pair;
code for generating speed data of the image capture at the time and location of capture of each image in the plurality of images; and
code for partitioning the ordered list of images into one or more event subsets on the basis of a cost function, said cost function being determined in accordance with a normalisation of the time variable and distance variable, wherein the time variable and the distance variable are weighted using the speed data.

* * * * *